Sept. 27, 1966  J. P. KRYSTOF  3,274,646
APPARATUS FOR MAKING EXTRUDED SHEET MATERIAL
Filed May 13, 1963  4 Sheets-Sheet 1

INVENTOR.
JOSEPH P. KRYSTOF
BY
Peter L. Costas
ATTORNEY

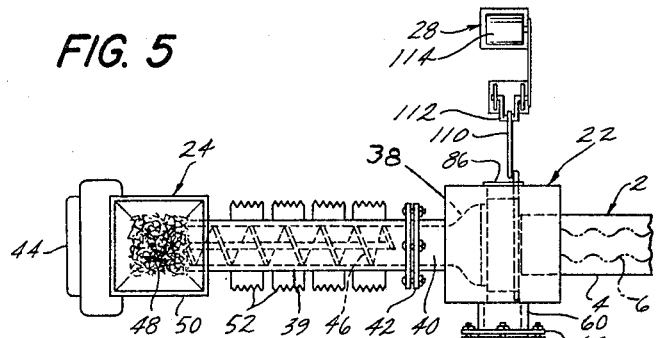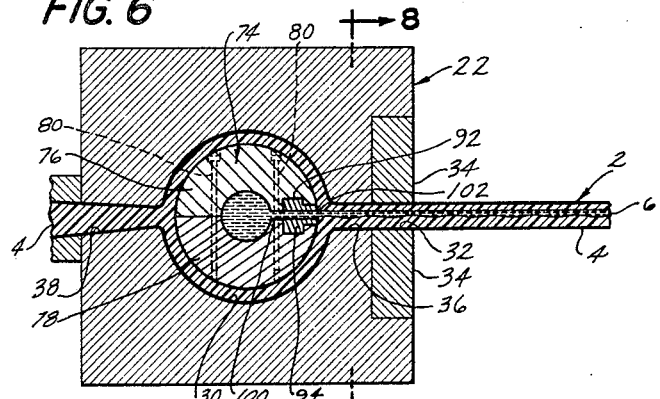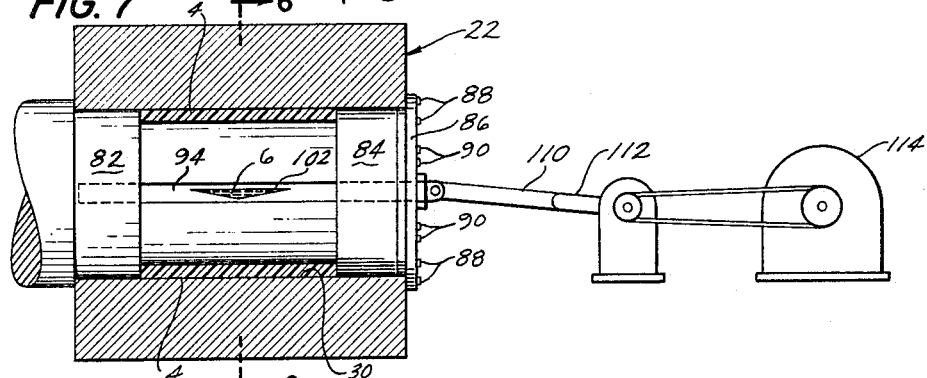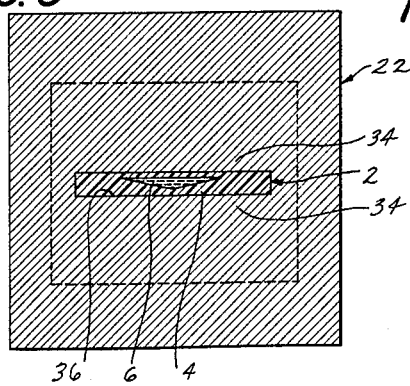
INVENTOR.
JOSEPH P. KRYSTOF
BY Peter L. Costas
ATTORNEY Sept. 27, 1966   J. P. KRYSTOF   3,274,646
APPARATUS FOR MAKING EXTRUDED SHEET MATERIAL
Filed May 13, 1963   4 Sheets-Sheet 3

INVENTOR.
JOSEPH P. KRYSTOF
BY
Peter L. Costas
ATTORNEY

Sept. 27, 1966   J. P. KRYSTOF   3,274,646
APPARATUS FOR MAKING EXTRUDED SHEET MATERIAL
Filed May 13, 1963   4 Sheets-Sheet 4

INVENTOR.
JOSEPH P. KRYSTOF
BY
Peter L. Costas
ATTORNEY

United States Patent Office 3,274,646
Patented Sept. 27, 1966

3,274,646
APPARATUS FOR MAKING EXTRUDED
SHEET MATERIAL
Joseph P. Krystof, Kensington, Conn., assignor to Rowland Products, Incorporated, Kensington, Conn., a corporation of Connecticut
Filed May 13, 1963, Ser. No. 279,919
13 Claims. (Cl. 18—13)

The present invention relates to the extrusion of synthetic plastic sheet material, and more particularly to novel apparatus for extruding sheet material having bands of differentially colored material therein.

Oftentimes, the provision of extruded sheet material with differentially colored bands therein is desirable, particularly for novel decorative effects. Generally, such bands of color extend parallel to the direction of extrusion, and a highly effective apparatus and method for making such material are described in United States Patent No. 2,985,556, granted May 23, 1961, to William P. Rowland. Other techniques of introducing differentially colored material into the body of the extruded sheet are shown in United States Patent No. 2,632,204 to Murray and United States Patent No. 2,803,041 to Hill et al.

The term "differentially colored material" is intended to encompass materials which are visually distinguishable from the material of the body of the sheet to provide a visual pattern effect including the use of colors or substantial lack of color distinct from that of the body of the sheet and the use of the same color but having distinct optical properties so as to produce variation in light refraction or transmission with resultant visual pattern effect.

It is an object of the present invention to provide apparatus for extruding synthetic plastic sheet material having a generally longitudinally extending band of differentially colored material wherein the band has a plurality of undulations extending transversely of the sheet material.

Another object is to provide extrusion apparatus for conveniently and economically introducing a band of differentially colored material into the body of the plastic sheet material which varies the transverse location of the point of introduction longitudinally of the sheet material.

A specific object is to provide apparatus for extruding such synthetic plastic sheet material having an undulating band of differentially colored material which is particularly adapted for convenient fabrication of eyeglass frames having a bridge portion colored differentially from the tops of the lens-receiving portions.

Other objects and advantages will be apparent from the following detailed description and claims and the attached drawings wherein:

FIGURE 5 is a plan view of an extruder assembly embodying the present invention;

FIGURE 6 is a fragmentary sectional view along the line 6—6 of FIGURE 7;

FIGURE 7 is a fragmentary front elevational view to an enlarged scale of the extruder assembly of FIGURE 5 with portions of the die block and the die lips removed to reveal internal construction;

FIGURE 8 is a sectional view of the die assembly along the line 8—8 of FIGURE 6;

FIGURE 10 is a front elevational view of another sliding discharge nozzle construction embodying the present invention;

Figure 1:
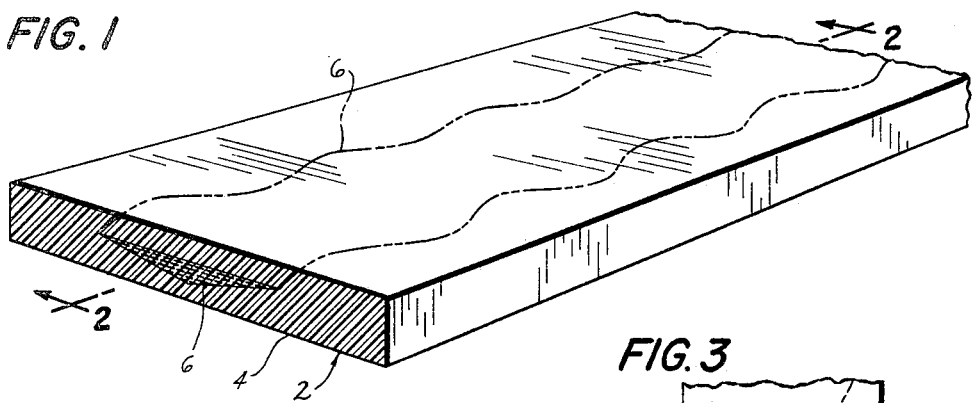
FIGURE 1 is a fragmentary perspective view of one embodiment of synthetic plastic sheet material extruded in accordance with the present invention.

It has been found that the foregoing and related objects may be readily attained by an extruder assembly comprising an extruder die member having a chamber therein and an extrusion orifice in one surface thereof which communicates with the chamber, a first conduit for supplying a mainstream of fluid synthetic thermoplastic material to the chamber at a point spaced from the extrusion orifice and a second conduit for supplying a stream of differentially colored fluid synthetic thermoplastic material to the chamber having a discharge portion within the chamber extending and movable substantially parallel to the die orifice between the point of supply from said first conduit and the die orifice. The discharge portion has a discharge aperture therein which opens adjacent the die orifice and is of smaller cross section, and means are provided for reciprocating the discharge portion and its discharge aperture substantially parallel to the die orifice and transversely of a plastic mainstream issuing from the first conduit to discharge thereinto a differentially colored band moving longitudinally of the second conduit. Thus, the sheet of plastic material issuing from the die orifice is comprised of the thermoplastic material of the mainstream with a generally longitudinally extending differentially colored band encased therein and having a transverse directional component and sharply defined linear margins which are substantially free from washout.

The extruder assembly is desirably provided with a longitudinally extending slot in a portion of the second conduit within the chamber and a slide member which is slidably mounted in the slot and has the discharge aperture therein. The actuating motor or drive means thus imparts sliding movement to the slide member within the slot. The discharge aperture may be a single large aperture in the slide member or it may be comprised of a plurality of spaced-apart tubular members which project outwardly therefrom and have their hollow portions communicating with the interior of the second conduit.

According to the preferred aspect, the chamber is generally cylindrical and the second conduit has a generally cylindrical portion extending within the chamber and coaxial therewith but of smaller external diameter than the diameter of the chamber to provide a spacing therebetween. The second conduit portion has an axial, generally T-shaped slot opening on the outer surface thereof adjacent the die orifice and the slide member is of a configuration generally matching the slot so as to fit firmly therein but to slide relatively freely. In this manner, the mainstream from the first conduit flows around both above and below the second conduit, and the differentially colored material is injected thereinto with the shape and dimension of the band of differentially colored material in the extruded sheet material determinable by the shape of the discharge aperture in the movable slide member and the relative pressures in the two conduits.

In accordance with one aspect of the invention, the movable discharge portion may be moved in a uniform motion during continuous flow of material through its discharge aperture to provide a smoothly undulating band of color or a second component of relatively different speed of movement may be imparted to the mechanism operating the movable discharge portion to provide a superposed undulatory movement during each major undulation. Although the discharge aperture may be open continuously during the reciprocation of the movable discharge portion so as to provide a longitudinally continuous band, the movable discharge portion may cooperate with feed apertures of limited length in the conduit to provide bands of color which are of limited length.

Referring now in detail to the drawings, in FIGURE 1 there is illustrated one embodiment of synthetic plastic sheet material extruded integrally in accordance with the present invention and generally designated by the numeral 2. Encased within the main body portion 4 of synthetic thermoplastic is a generally longitudinally extending band 6 of differentially colored synthetic thermoplastic material which is spaced between the upper and lower surface of the sheet material 2 and which has a plurality of transversely extending undulations along the length of the sheet material. The side margins of the color band 6 are substantially sharply defined and linear and substantially free from transverse washout so as to provide a clearly defined, uniformly repeating pattern.

An especially attractive color gradient effect results from the flattened triangular cross-section of the illustrated color band 6 and the use of relatively transparent material in the main portion 4 and the color band 6. As the thickness of the color band 6 gradually decreases from the apex of the triangle to either side, the intensity of color correspondingly decreases with corresponding increase in transparency to achieve a gradual fading toward either edge of the color band 6.

Figure 3:
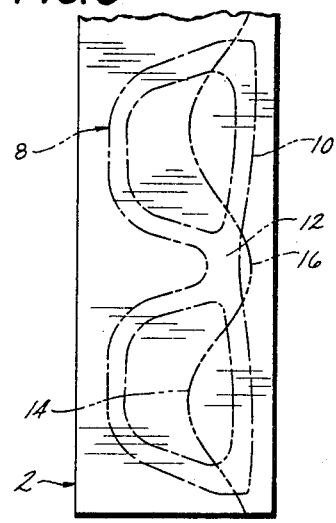
FIGURE 3 is a plan view of the longitudinally halved material of FIGURE 2 with the outline of an eyeglass frame to be cut therefrom shown in phantom line.
Figure 2:
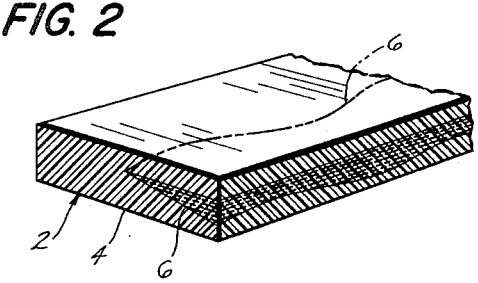
FIGURE 2 is a similar view as longitudinally halved along the line 2—2 of FIGURE 1.

As shown in FIGURE 3, the pattern of transverse undulations of the color band 6 is particularly adapted to the fabrication of an eyeglass frame shown in phantom line and generally designated by the numeral 8. The pattern for the frame 8 is laid out upon the sheet material 2 with the upper lens-receiving portions 10 located within two consecutive peaks 14 in the color band 6 and its bridge portion 12 aligned with a valley 16 comprised of the body portion 4 of the sheet. In this manner, a rough eyeglass frame having the desired distribution of color may be quickly and simply stamped from the synthetic plastic sheet material of the present invention.

Figure 4:
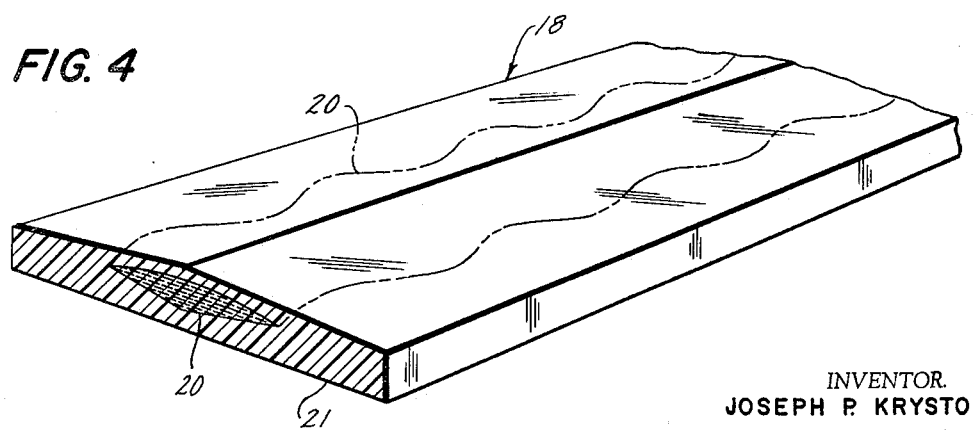
FIGURE 4 is a fragmentary perspective view similar to FIGURE 1 of another embodiment of synthetic plastic sheet material extruded in accordance with the present invention.

In FIGURE 4, there is illustrated another embodiment of synthetic plastic sheet material produced by the present invention generally indicated by the numeral 18 and which employs a modified cross-sectional configuration for both the sheet 18 and the color band 20 as it undulates through the body portion 21 to produce somewhat different color gradient characteristics. Other configurations for the sheet material and color band may be readily employed.

Referring now to FIGURE 5, therein is shown an extruder assembly embodying the present invention and generally comprised of an extruder die block assembly generally designated by the numeral 22, a first extruder and conduit assembly generally designated by the numeral 24, and a second extruder and conduit assembly generally designated by the numeral 26. As will be described in detail hereinafter, a drive mechanism generally designated by the numeral 28 oscillates a movable discharge portion (not shown) of the second conduit 26 within the die block assembly 22 to produce the sheet material 2 having an undulating differentially colored band 6 shown in phantom line.

As best seen in FIGURES 6–8, the die block assembly 22 has a generally cylindrical chamber 30 therein and an elongated extrusion orifice 32 defined by the die lips 34 in the front face of the extruder block assembly 22 communicating with the chamber 30 through a short discharge duct 36 of constant cross section and equal to that of the orifice 32.

The mainstream of plastic material for the body portion 4 of the sheet material is fed into the chamber 22 through the mainstream duct portion 38 of the intake section 40 of the extruder and conduit assembly 24. Before entering the duct portion 38, the plastic material passes through the heating section 39 of the conduit which is coupled to the intake section 40 by the collar assembly 42.

To supply and melt the plastic material, therein is shown a conventional extrusion mechanism wherein a motor 44 drives the feed screw 46 to draw synthetic plastic pellets 48 stored in the hopper 50 through the heating section 39 of the conduit where a series of heating elements 52 melts the pellets 48 into a fluid stream of synthetic thermoplastic material.

The duct portion 38 of the intake section 40 flattens vertically and widens transversely as it nears the chamber 30, shaping the mainstream 4 until it is discharged into the chamber 30, preferably with a cross section approximating that of the extrusion orifice 32.

A stream of fluid synthetic thermoplastic material for the color band 6 is supplied to the chamber 30 by the second extruder and conduit assembly 26 wherein the conduit similarly includes a heating section 58 and an intake section 60 joined by the collar assembly 62. The motor 64 drives the feed screw 66 to draw the colored plastic pellets 68 stored in the hopper 70 through the heating section 58 wherein the heating elements 72 melt the pellets into a fluid stream of synthetic thermoplastic material.

The intake section 60 of the second supply conduit 56 has a generally cylindrical tubular inner portion 74 which extends across the chamber 30 rearwardly of the die orifice 32 and has an outer diameter smaller than the diameter of the chamber 30 so as to be radially spaced from the wall thereof. Conveniently, the inner portion 74 is comprised of two segments 76, 78 tightly joined by secantally disposed locking bolts 80 as shown in FIGURE 6. The inner portion 74 is coaxially mounted in the chamber 30 to define flow paths for the mainstream 4 of plastic material therearound both above and below. These flow paths within the chamber 30 are further bounded by the annular collars 82, 84 which are tightly fitted about the inner portion 74 adjacent the ends of the chamber 30 which serve to seal the ends of the chamber 30. To lock the inner portion 74 within the chamber 30, the flanged cap 86 is secured to the extruder block 22 by bolts 88 through the flange thereof and bolts 90 secure the end of the inner portion 74 to the cap 86 as shown in FIGURES 7 and 9.

The inner portion 74 is provided with a longitudinally extending generally T-shaped slot 92 opening adjacent the die orifice 32 and which slidably receives therein a longitudinally movable, generally T-shaped slider nozzle 94. By fabricating the inner portion from two segments 76, 78 as illustrated, the T-slot 92 is conveniently machined into the segments to receive firmly but slidably the slider nozzle 94. To discharge the plastic material from the interior of the inner portion 74, an elongated aperture 100 extends from the interior to the T-slot 92 for communication with the nozzle 94 which has a flattened triangular nozzle discharge aperture 102 therein as shown in FIGURE 7. The aperture 100 is of a length equal or greater than the limits of movement of the ends of the nozzle discharge aperture 102 to ensure an adequate, uniform supply of colored fluid plastic to the sliding nozzle 94 as it moves along the T-slot 92. As seen in FIGURE 7, the slider nozzle 94 must be of sufficient length to extend under both collars 82, 84 to prevent leakage through the slot 92 when the slider nozzle 94 is at either end of its range of movement. As seen in FIGURE 9, the flanged cap 86 is notched to allow the end of the nozzle 94 to extend therethrough.

Figure 9:
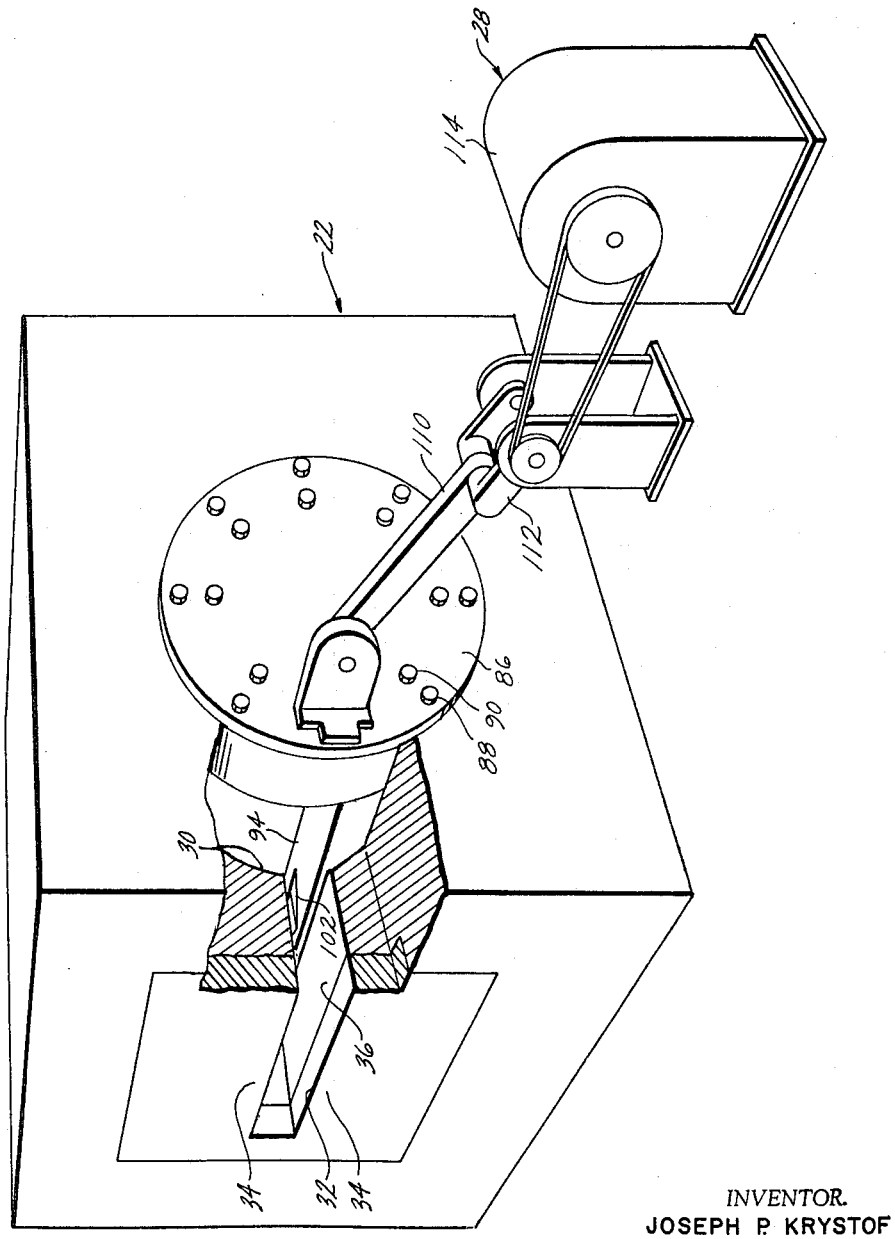
FIGURE 9 is a perspective view to an enlarged scale of the extruder die block and drive mechanism of the extruder assembly of FIGURE 5 with portions of the die block and the plastic material removed to reveal internal construction.

During operation of the assembly, the slider nozzle 94 is moved transversely of the mainstream while discharging the differentially colored material thereinto to produce a transverse directional component in the resulting color band by the drive mechanism 28 which is connected thereto and which is shown in FIGURES 5, 7 and 9. More particularly, the connecting rod 110 is pivotally connected at one end to the end of the slider nozzle 94 protruding from the flanged cap 86 and at the other end is pivotally connected to a crank unit 112 driven by motor 114. Thus, rotation of the shaft of the motor 114 will impart longitudinal sliding movement to the slider nozzle 94 through the eccentric action of the crank unit 112 and move it to either extreme position of movement while maintaining the chamber 30 in a sealed condition.

Referring now in detail to the operation of the apparatus of FIGURES 5–9, fluid plastic material 4 from the extruder assembly 24 is introduced through the duct portion 38 of the conduit into the rear of the chamber 30 and flows through the chamber 30 above nad below the inner portion 74 of the second conduit. Simultaneously, differentially colored fluid plastic material 6 from the extruder assembly 26 is being supplied to the second conduit inner portion 74 and being discharged through the aperture 100 to the T-slot 92. Since the slider nozzle 94 is being moved longitudinally of the conduit and transversely of the mainstream 4 by the action of the drive mechanism 28, the discharge aperture 102 which admits the material 6 from the aperture 100 releases the differentially colored stream 6 adjacent the die orifice 32 but is being displaced in a path reciprocating along its length, thus producing a band which undulates transversely along the length of the sheet.

Figure 12:
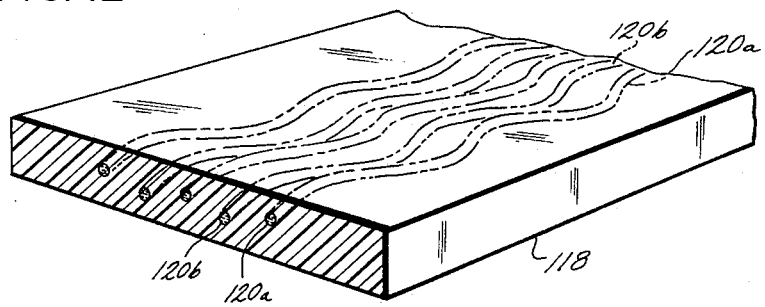
FIGURE 12 is a fragmentary perspective view of synthetic plastic sheet material extruded by the embodiment of FIGURE 10.

For producing an alternative color pattern in the synthetic plastic sheet material shown in FIGURE 12, the slider nozzle embodiment 94a of FIGURE 10 is provided with a plurality of small tubular members 116a, 116b communicating with the interior of the second conduit and spaced both longitudinally and vertically so as to inject a plurality of small streams of differentially colored material of any desired transverse and vertical spacing within the mainstream. In this manner, the sheet of FIGURE 12 having a plurality of relatively thin color bands 120a, 120b extending longitudinally but undulating transversely may be produced with the body or main thermoplastic material 118.

A further embodiment utilizing this plural discharge member may be obtained by using the slider nozzle 94a of FIGURE 10 in combination with an inner portion 74, the elongated aperture 100 of which is replaced with a plurality of spaced apertures registrable with the tubular members 116 during movement thereof. As the slider nozzle 94a moves across the spaced apertures, the tubular members 116 register with the spaced apertures intermittently to produce discontinuous bands of color of relatively short length in the extruded plastic sheet material. The spacing of the tubular apertures may be related to that of the members 116 to result in simultaneous discharge or any desired sequential discharge to produce a great variety of patterns in the finished plastic sheet.

Figure 11:
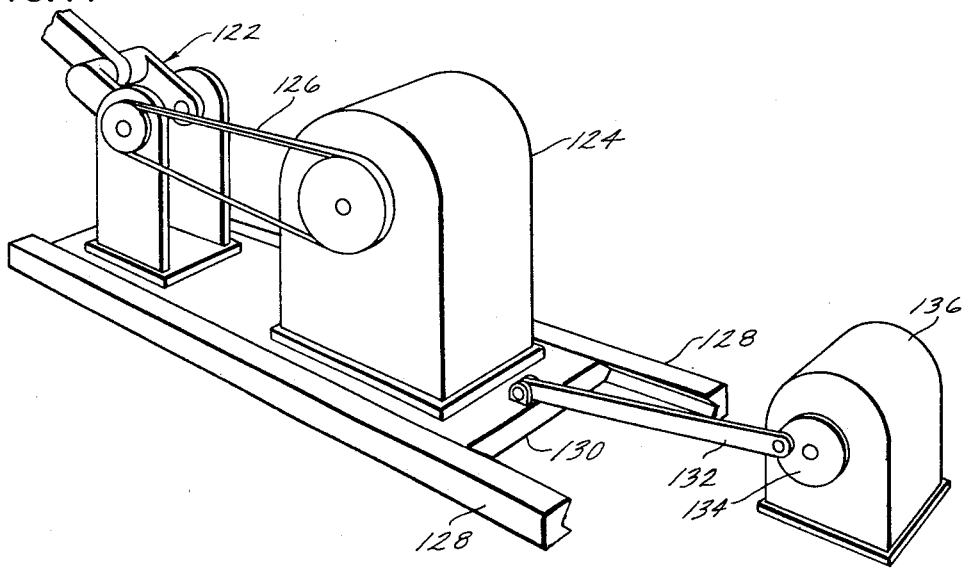
FIGURE 11 is a perspective view of another mechanism for driving the discharge nozzle in accordance with the present invention.
Figure 13:
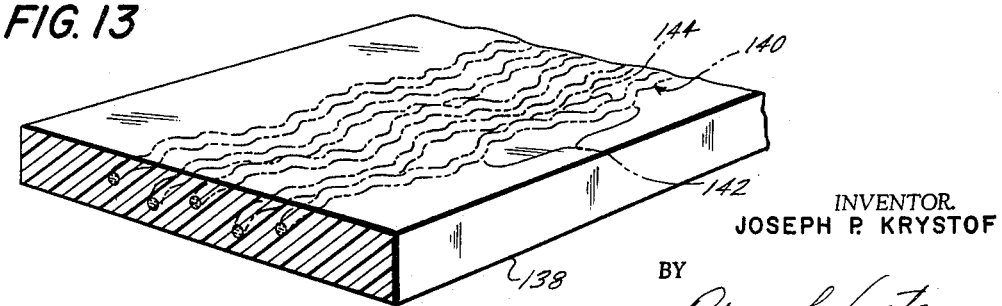
FIGURE 13 is a fragmentary perspective view of synthetic plastic sheet material extruded in accordance with the present invention using the discharge nozzle embodiment of FIGURE 10 and the nozzle drive mechanism of FIGURE 11.

In accordance with still another embodiment of the invention, patterns such as that shown in FIGURE 13 may be produced by reciprocating the slider nozzle 94a of FIGURE 10 with the drive mechanism of FIGURE 11. This drive means includes a first crank and connecting rod assembly pivotably connected to the end of the slider nozzle 94a and generally designated by the numeral 122. The assembly 122 is driven by the motor 124 through the belt 126 and both the assembly 122 and the motor 124 are mounted on a platform 130 which is slidably mounted on the tracks 128 for movement in the longitudinal direction of the second conduit. The platform 130 is reciprocated by the pivotally connected rod 132 which is actuated by its eccentric mounting to the crank element 134 on the shaft of the motor 136. Thus, the motor 136 reciprocates the platform 130 and imparts to the slider nozzle 94a a second movement of different period so as to produce the compound undulations in the color bands 140 extending through the body 138 of the sheet material in FIGURE 13. Accordingly, the major undulations blanketed by the bracket 142 has superposed thereon a plurality of smaller undulations such as indicated by the bracket 144.

It will be apparent that variations in the rate and stroke of reciprocation of the slider nozzle and/or in the superimposition of additional reciprocating movements upon the slide actuating mechanism permit great versatility of pattern formation. The cross section of the color band may be in many forms other than the flattened triangle and the small circle shown in the figures. When the flow velocity of the mainstream is substantially equal to that of the coloring stream at the area of injection, the cross section of the color band will remain in substantially the same form as that of the discharge opening. If the velocity of the coloring stream exceeds that of the mainstream, the color band will expand somewhat and a tendency towards minor eddy currents will tend to cloud the outlines of the color band.

The present invention is advantageously employed with various synthetic thermoplastic materials such as cellulose acetate and cellulose acetate-butyrate. Various dyes and pigments may be used to provide color or varying density of coloration to one or both plastic streams to achieve the visual differentiation in color, refraction or transparency.

Thus it is apparent that the apparatus and method of the present invention provide convenient, practical and highly effective means of extruding synthetic plastic sheet material having a band of differentially colored material variable transversely of the sheet which may produce a wide variety of patterns. The apparatus and method are versatile in operation and produce synthetic plastic sheet material having a generally longitudinally extending color band with an almost limitless number of variations in transverse directional components and color intensity. When the apparatus is used to produce synthetic plastic sheet having a generally longitudinally extending color band with relatively widely spaced and substantially regular transverse undulations, the sheet product is ideally suited to the manufacture of eyeglass frames having a bridge portion differentially colored from that of the tops of the lens portions. Since the apparatus and method are relatively foolproof and easily adapted to variations, a great latitude in pattern design is hereby permitted in relatively economical extruded sheet material.

Because the discharge aperture (or apertures) for the differentially colored stream is reciprocated across the mainstream and uniform in cross section during its movement, the resultant color band issuing therefrom is uniform and is encased within the mainstream material and substantially free from the effect of drag or laminar flow characteristics on the walls on the die. Thus, the color band in the extruded composite product has relatively sharply defined, linear edges which are substantially free from washout and, accordingly, a clearly defined repeating pattern is obtained.

Having thus defined the invention, I claim:

1. An extrusion assembly for fabricating synthetic thermoplastic sheet material having a differentially colored band therein comprising an extruder die member having a chamber therein and an extrusion orifice in one surface thereof communicating with said chamber; a first conduit for supplying a mainstream of fluid synthetic thermoplastic material to said chamber at a point spaced from said extrusion orifice; a second conduit for supplying a stream of differentially colored fluid synthetic thermoplastic material to said chamber, said second conduit having a portion extending within said chamber generally parallel to said extrusion orifice and of smaller external dimension than said chamber to allow flow about at least one surface of a main stream of fluid synthetic thermoplastic material issuing from said first conduit, said second conduit portion having a discharge portion within said chamber reciprocable substantially rectilinearly and substantially parallel to said die orifice between said point of supply from said first conduit and said die orifice, said reciprocable discharge portion having a discharge aperture thereing opening adjacent said die member orifice; and means for reciprocating said discharge portion and its discharge aperture substantially parallel to said die orifice and transversely of a plastic mainstream issuing from the first conduit to discharge thereinto a differentially colored band moving longitudinally of said second conduit and to produce a sheet of thermoplastic material extruding from said die orifice comprised of the thermoplastic material of the mainstream with a generally longitudinally extending color band embedded therein and having a transverse directional component.

2. The extrusion assembly of claim 1 wherein said discharge aperture in said reciprocable conduit portion is comprised of a plurality of spaced-apart tubular members projecting outwardly therefrom.

3. The extrusion assembly of claim 1 wherein said reciprocable discharge portion is provided by a longitudinally extending slot in said second conduit within said chamber and a slide member slidably mounted in said slot and having said discharge aperture therein and wherein said reciprocating means imparts sliding movement to said slide member.

4. An extrusion assembly for fabricating synthetic thermoplastic sheet material having a differentially colored band therein comprising an extruder die member having a chamber therein and an extrusion orifice in one surface thereof connecting with said chamber; a first conduit for supplying a mainstream of fluid synthetic thermoplastic material to said chamber at a point spaced from said extrusion orifice; a second conduit for supplying a stream of differentially colored fluid synthetic thermoplastic material to said chamber, said second conduit having a portion extending within the chamber generally parallel to said extrusion orifice and of smaller external dimension than said chamber to allow flow thereabout of a mainstream of fluid synthetic thermoplastic material issuing from said first conduit, said second conduit portion having a discharge nozzle component generally facing the extrusion orifice and movably supported thereby for movement longitudinally of said second conduit portion, said discharge nozzle component having a discharge aperture therein communicating with the interior of said second conduit and opening between said point of supply from said first conduit and said die member orifice; and means for imparting reciprocal movement to said discharge nozzle component and its discharge aperture longitudinally of said second conduit and transversely of a plastic mainstream issuing from the first conduit to discharge thereinto and encase a differentially colored band moving longitudinally of said second conduit and to provide a sheet of thermoplastic material extruding from said die orifice comprised of the thermoplastic material of the mainstream with a generally longitudinally extending color band encased therein and having a transverse directional component.

5. The assembly of claim 4 wherein the portion of said second conduit extending within said chamber is provided with a longitudinally extending slot in an aperture through its side wall from the interior of said conduit opening in said slot and wherein said movable discharge nozzle component is elongated and slidably mounted in said slot for reciprocal movement.

6. The assembly of claim 4 wherein said means for imparting motion to said movable discharge nozzle component includes a crank and connecting rod assembly for imparting limited reciprocal movement.

7. The assembly of claim 4 wherein said means for imparting motion to said movable discharge nozzle component includes a first actuating means for imparting limited reciprocal movement to said discharge nozzle component longitudinally of said second conduit portion and a second actuating means for imparting limited reciprocal movement to said first actuating means in a direction generally longitudinally of said second conduit portion to provide two components of transverse motion to the discharge nozzle.

8. The assembly of claim 4 wherein said discharge aperture is comprised of a plurality of spaced apart tubular members projecting outwardly from said discharge nozzle component and towards said die member orifice.

9. An extruder assembly for fabricating synthetic thermoplastic sheet material having a differentially colored band therein comprising an extruder die member having a generally cylindrical chamber therein and an extrusion orifice in one surface thereof communicating with said chamber; a first conduit for supplying a mainstream of fluid synthetic thermoplastic material to said chamber opposite said die member orifice and in a path generally perpendicular to said extrusion orifice; a second conduit for supplying a stream of differentially colored fluid synthetic thermoplastic material to said chamber, said second conduit having a generally cylindrical tubular portion coaxially mounted within said chamber, said second conduit being of lesser external diameter than the diameter of the wall of said chamber to provide radial spacing therebetween, said second conduit portion having an elongated slot therein generally facing said die member extrusion orifice and having an aperture from the interior thereof opening in said slot; an elongated discharge nozzle component slidably mounted in said slot for movement longitudinally of said second conduit portion, said discharge nozzle component having a discharge aperture therein registering with said aperture in the second conduit portion during movement thereof and opening adjacent said die member orifice; and means for reciprocating said discharge nozzle component in said slot and transversely of a plastic mainstream issuing from the first conduit and flowing about said second conduit to discharge thereinto a differentially colored band moving longitudinally of said second conduit portion and to produce a sheet of thermoplastic material extruding from said die orifice comprised of the thermoplastic material of the mainstream with a generally longitudinally extending colored band having a transverse directional component.

10. The assembly of claim 9 wherein said discharge nozzle component and slot are of a dimension to extend outwardly of the ends of said chamber at either extreme of the reciprocal movement of said discharge nozzle component.

11. The assembly of claim 9 wherein said discharge aperture in said discharge nozzle component is comprised of a plurality of spaced apart tubular members projecting outwardly therefrom.

12. The assembly of claim 9 wherein said means for imparting motion to said movable discharge nozzle component includes a first actuating means for imparting limited reciprocal movement to said discharge nozzle component longitudinally of said second conduit portion and a second actuating means for imparting limited reciprocal movement to said first actuating means in a direction generally longitudinally of said second conduit portion to provide two components of transverse motion to the discharge nozzle.

13. The assembly of claim 9 wherein said means for imparting motion to said movable discharge nozzle component includes a crank and connecting rod assembly for imparting limited reciprocal movement.

References Cited by the Examiner

UNITED STATES PATENTS

| | | | |
|---|---|---|---|
| 1,994,164 | 4/1935 | Bailey | 264—92 |
| 2,389,084 | 11/1945 | Routh | 18—13 X |
| 2,573,050 | 10/1951 | Orsini. | |
| 2,632,204 | 3/1953 | Murray | 18—13 |
| 2,803,041 | 8/1957 | Hill et al. | 18—13 X |
| 2,928,201 | 3/1960 | Shanok et al. | 161—6 |
| 2,932,855 | 4/1960 | Bartlett et al. | 264—171 |
| 2,952,043 | 9/1960 | Uraneck et al. | 264—171 |
| 2,980,574 | 4/1961 | Menzer | 161—6 |
| 3,019,147 | 1/1962 | Nalle | 18—12 X |
| 3,070,840 | 1/1963 | Mercer | 18—12 |
| 3,072,962 | 1/1963 | McDermott et al. | 18—12 |
| 3,172,154 | 3/1965 | Martin et al. | |

WILLIAM J. STEPHENSON, *Primary Examiner.*

JACOB H. STEINBERG, *Examiner.*